United States Patent [19]

Ackermann et al.

[11] 3,911,046
[45] Oct. 7, 1975

[54] PROCESS FOR THE RECOVERY OF FORMALDEHYDE AND PHENOL

[75] Inventors: Jacob Ackermann, Gorla Minore (Varese); Pierino Radici, Turate (Como); Pietro Erini, Olgiate Olona (Como), all of Italy

[73] Assignee: Societa Italiana Resine S.I.R. S.p.A., Milan, Italy

[22] Filed: Dec. 21, 1972

[21] Appl. No.: 317,491

[30] Foreign Application Priority Data

Dec. 27, 1971 Italy................................ 32951/71

[52] U.S. Cl. ............... 260/840; 260/29.3; 260/51.5
[51] Int. Cl.² ................... C08G 14/08; C08L 61/24
[58] Field of Search.................. 260/840, 51.5, 29.3

[56] References Cited
UNITED STATES PATENTS 1,717,600    6/1929    Bender............................... 260/840
2,315,087    3/1943    Cuvier................................ 260/840
3,616,179    10/1971   McCombs et al................... 260/840

OTHER PUBLICATIONS

Chem. Abstracts, Vol. 75, 1971, p. 294, (25027a).

Primary Examiner—John C. Bleutge
Attorney, Agent, or Firm—Sughrue, Rothwell, Mion, Zinn & Macpeak

[57]   ABSTRACT

Formaldehyde and phenol are recovered from waste liquors as useful products, with purification of the liquors, by blending of the relative dilute solutions under conditions such as will firstly bring about virtually complete elimination of the phenol in the form of resol phenolic resin and in the subsequent preparation of a mixed resin from phenol, formaldehyde and urea, by reaction of a further quantity of formaldehyde with urea, the said reaction taking place in the presence of the previously prepared resol phenolic resin.

9 Claims, No Drawings

PROCESS FOR THE RECOVERY OF FORMALDEHYDE AND PHENOL

BACKGROUND OF THE INVENTION

1. Field of the Invention

The present invention relates to the recovery of formaldehyde and phenol contained in industrial waste waters.

More particularly, the invention relates to a process for the simultaneous recovery, and in the form of useful products, of formaldehyde and phenol from aqueous waste solutions which contain the said products in quantities of less than approximately 10% by weight. Waste solutions of this type are, for example, produced in industrial processes for the production of phenol, or in processes for the production of paraformaldehyde, and particularly in the phase wherein commercial aqueous solutions of formaldehyde are subjected to concentration.

Waters which are thus contaminated are also discharged in industrial processes for the production of resins from formaldehyde and phenol.

2. Description of the Prior Art

The virtually complete recovery and elimination of the chemical products contained in industrial waste is an ever more vital problem, both from the point of view of improving the industrial processes, and also by virtue of the need to reduce and possibly completely eliminate pollution.

Therefore, the most desirable way of recovering chemicals from industrial waste resides in eliminating the causes of the pollution and at the same time in improving the general economy of industrial processes.

The recovery of formaldehyde or phenol from dilute aqueous solutions as mentioned hereinabove may be carried out by fractional distillation of such solutions.

However, in view of the extent to which the liquid-vapor balance is dependent upon the conditions in which evaporation takes place, such as the temperature and rate of evaporation, the pH of the medium and the presence of any extraneous products, efficient separation can be obtained only under conditions in which the process itself proves to be very costly.

Furthermore, the separation of the water from polluting products by means of distillation may be facilitated by prior chemical blockage of the formaldehyde and phenol, chemical blockage being understood as the transformation of the formaldehyde and phenol into products of low volatility by reaction with suitable additives.

A process of this type may have interesting aspects if the formaldehyde and phenol are blocked by the same reagent, or in fact if the reaction between the phenol and formaldehyde can be brought about without the use of different reagents. We would, however, note that the simultaneous recovery of formaldehyde and phenol from waste aqueous solutions by reaction between the said formaldehyde and the said phenol, without the action of various reagents, and subsequent distillation of water from the resultant products is advisable only if the following conditions are satisfied:

1. the operations required for the reaction are not very costly;
2. the quantity of formaldehyde and phenol recovered is very high;
3. the products remaining after distillation of the water are valuable and the value of such products is possibly equal to or even greater than the cost of recovery.

In the event of one reagent being used for blocking the formaldehyde and phenol, one further condition should be satisfied:

4. the cost of the reagent should be as low as possible.

At present, no processes suitable for the simultaneous recovery of formaldehyde and phenol by chemical blocking with a reagent common to the said substances and which completely satisfy the four conditions outlined are at present known in the industry. Furthermore, it is known that the phenol and the formaldehyde are capable of reacting together in a virtually complete manner and under conditions of reaction which are not very difficult to procure, yielding resol phenolic resins which are easily concentrated by distillation of the water. A process which comprises this reaction satisfies the first two conditions described.

However, a process of this type does not make it possible to obtain a commercially usable resol phenolic resin.

This fact must be related to the particular nature of the aqueous solutions which are subjected to the treatment, and in particular to the considerable dilution of the said solutions.

In fact, in order to achieve those conditions, particularly the pH of the medium, which are necessary in order to bring about the reaction between the formaldehyde and phenol, relatively large quantities of basic catalyst are required, generally sodium hydroxide.

As a result, the resol phenolic resins obtained after separation of the water have such a high catalyst content as to render any form of practical use impossible.

SUMMARY OF THE INVENTION

It has now been found possible to avoid the disadvantages described in the simultaneous recovery of phenol and formaldehyde from the relative dilute aqueous solutions, by a process according to the present invention which comprises chemical blockage of the said phenol and formaldehyde with a reagent common to such substances.

Therefore, one object of the present invention is a process for the virtually complete and moreover simultaneous separation of phenol and formaldehyde, and the production of non-polluted waters, from waste aqueous solutions which contain phenol and formaldehyde in quantities less than approximately 10% by weight.

A further object of the present invention is a process which permits recovery, in the form of a useful product, of phenol and formaldehyde contained in the said solutions.

A further object of the present invention is a simple and economically suitable process for the said recovery.

Further objects of the invention will become manifest from the following description.

DETAILED DESCRIPTION OF THE INVENTION

The process of the present invention consists essentially in bringing into contact the phenol and the formaldehyde, but by blending of the relative dilute solutions under conditions such as will firstly bring about virtually complete elimination of the phenol in the form of resol phenolic resin and in the subsequent preparation of a mixed resin from phenol, formaldehyde and urea, by reaction of a further quantity of formaldehyde with urea, the said reaction taking place in the presence of the previously prepared resol phenolic resin. The said mixed resin is finally recovered by distillation of the water, working at a pressure below atmospheric pressure.

More particularly, according to one embodiment of the present invention, the phenol is first caused to react with the formaldehyde, working with an excess of this latter component, and virtually complete transformation of the phenol into the resol phenolic resin is achieved. The free formaldehyde is then blocked by reaction with urea, working in the presence of the resol phenolic resin.

According to another embodiment of the present invention, the formaldehyde and the phenol are first caused to react under conditions such as will bring about the complete transformation of the reagents in the resol phenolic resin, and for this purpose the aqueous solutions of formaldehyde and phenol are blended so as to ensure the quantities or reagents stoichiometrically needed for the formation of the resin itself.

To the resultant product, urea is added in addition to formaldehyde, this latter component again being in the form of a dilute aqueous solution, and the mixed resin is formed.

The waste aqueous solutions which are treated according to the process of the present invention normally contain phenol in concentrations of 0.01 to 5% by weight, while the concentration of formaldehyde is generally between 0.5 and 10% by weight.

According to the process of the present invention, such aqueous solutions containing formaldehyde and phenol are blended and a resol phenolic resin is formed by working at temperatures above ambient temperatures and with a basic pH in the medium. More particularly, in this stage of the reaction, the pH of the aqueous medium is greater than 7, and is preferably higher than approximately 8, up to a pH of approximately 12.

For this purpose, an inorganic base is added to the aqueous solution containing phenol and formaldehyde, and normally sodium hydroxide is used in quantities of 0.12 to 0.35 moles to every mol of phenol.

The best results are obtained with a quantity of sodium hydroxide ranging from 0.20 to 0.25 moles to every mol of phenol.

Furthermore, in the formation of the resol phenolic resin, the working temperatures are in excess of approximately 60°C, up to 120°C, the reaction times being comprised between 1 and 8 hours.

In that phase of the process in which the resol phenolic resin is prepared, it is possible to work with molar ratios of formaldehyde to phenol equal to approximately 2:1, and generally 1.8:1 to 2.3:1, so as to produce substantially complete reaction of the formaldehyde and of the phenol present in the aqueous solution.

It is also possible to work with formaldehyde in excess with respect to the quantity needed for the formation of the resol phenolic resin, up to a maximum value of molar ratio of formaldehyde to phenol equal to approximately 15:1.

In the preferred embodiment of the present invention, the resol phenolic resin is prepared by maintaining a slight excess of formaldehyde in the reaction medium; in other words by working with a molar ratio of formaldehyde to phenol of 3:1 to 4:1, the remaining quantity of formaldehyde being added in that stage of reaction in which the mixed phenol-formaldehyde-urea resin is prepared.

According to the process of the present invention, to the aqueous solution containing the resol phenolic resin is added urea and possibly a further quantity of the aqueous waste solution containing formaldehyde, and the mixed phenol-formaldehyde-urea resin is formed by treatment at temperatures of 60° to 120°C for periods of 1 to 4 hours.

In this second phase of the reaction, the molar ratios employed between the total formaldehyde and phenol are 3:1 to 15:1, and preferably 5:1 and 12:1, while the quantity of urea added is such as will permit in the medium a molar ratio of total formaldehyde to urea of 1:1 to 5:1.

Finally, the majority of the water is distilled from the reaction medium at a pressure below ambient pressure, and generally between 30 and 150 torr.

The best results are obtained according to the process of the present invention by carrying out a rapid evaporation of the water, for example by means of the instantaneous or thin layer distillation technique. In particular, distillation is continued until a residue is obtained, the dry content of which is greater than approximately 70% by weight.

By working under the conditions described, the distilled water is virtually bereft of pollutants, as will become obvious from the experimental examples which follow. Furthermore, the residue of distillation consists of a concentrated aqueous solution of the mixed phenol-formaldehyde-urea resin.

The said resin has a formaldehyde content of 35 to 50% by weight, a phenol content of 10 to 40% by weight and a urea content of 15 to 50% by weight.

In view of the small quantity of alkaline salts present, the said resin is useful as a modificant for those resins which are used in the production of plastic phenol laminates. It has been found that, in the application described, the mixed resin of the present invention offers various advantages such as, for example, those relating to reduced fragility.

Furthermore, the mixed resin of the present invention is also useful as a wood adhesive or as a modificant for the ureic resins used in the field of adhesives.

In this last case, the use of the mixed resin described provides advantages in connection with the improvement of stability over a period of time and with respect to water resistance.

EXAMPLE 1

Into a rotary laboratory type thin layer evaporator fitted with a boiler with a capacity of 1200 ml are placed 200 g of an aqueous waste solution containing formaldehyde and methanol in quantities equal to 2.20% by weight and respectively 0.56 by weight and 90 g of an aqueous waste solution containing phenol in a quantity equal to 5.11% by weight. 0.404 g of sodium hydroxide are added to the mixture.

The operations are carried out in an inert atmosphere, a stream of nitrogen being maintained to wash over the top of the condenser. The solution is weakly agitated by the flask being moved, and is maintained at 90°C for 4 hours by a thermostatically controlled oil bath. After this period of time, 528 g of the aqueous solution of formaldehyde previously described and 17.5 g of urea are added.

The mixture is again heated to 90°C and kept at that temperature and under weak agitation for 2 hours.

At the end of this period of time, the water is distilled from the mass, working at a pressure of 40 torr, a high rate of evaporation being obtained in this way. Evaporation is continued until a dry content in excess of 70% is attained in the liquid remaining in the boiler.

The distillate, equal to 785.5 g, was on analysis found to have a formaldehyde content equal to 0.2% by weight and a phenol content equal to 0.0031% by weight.

The residual solution after distillation had a viscous aspect and, when cold, tended to produce a precipitate.

This solution was composed of water (26.3% by weight) and a resin of the following composition:

| | |
|---|---|
| formaldehyde | 39.6% by weight |
| phenol | 12.29% by weight |
| urea | 47.02% by weight |
| caustic soda | 1.08% by weight |

EXAMPLE 2

Into a 1200 ml boiler of a laboratory type thin layer rotary evaporator are placed 625 g of aqueous solution of formaldehyde and 235 g of aqueous solution of phenol, the said solutions being identical to those described in Example 1.

To the mixture are added 1.02 g sodium hydroxide.

The apparatus is maintained in an inert atmosphere by a stream of nitrogen washing over the end part of the condenser.

By using a thermostatically controlled oil bath, the temperature is kept at 97°C for 3 hours while the mixture is kept under slight agitation.

At the end of this period of time, 6.25 g of urea are added and the medium is kept at the said temperature for 2 hours.

At the end of this time, the water is distilled rapidly, a pressure of 40 torr being maintained. The water separated in a quantity equal to 820 g, contains 0.12% by weight of formaldehyde and 0.0025% by weight of phenol.

At the base, an aqueous solution of a resin is separated, the composition of this resin being as follows:

| | |
|---|---|
| formaldehyde | 39.87% by weight |
| phenol | 37.43% by weight |
| urea | 19.33. by weight |
| caustic soda | 3.17% by weight |

EXAMPLE 3

Into the boiler of a thin layer rotary evaporator are placed 120 g of an aqueous waste solution of formaldehyde with a formaldehyde content equal to 6.6% by weight and 586.2 g of an aqueous waste solution of phenol with a phenol content equal to 1.41% by weight. 0.764 g of sodium hydroxide are added to the mixture. The operations are carried out in an inert atmosphere by a stream of nitrogen washing over the top of the condenser.

The solution, weakly agitated by movement of the flask, is kept at 80°C for 6 hours. At the end of this period, 170.9 g of aqueous solution of formaldehyde as previously described and 15.05 g of urea are added. The resultant solution is kept at 80°C for 3 hours. At the end of this period, the water is distilled off rapidly, working at a pressure of 120 torr. The water separated, in a quantity equal to 839 g, contains 0.16% by weight of formaldehyde and 0.0022% by weight of phenol. The residue of distillation (54 g) is a liquid which is oily when hot and which solidifies when cooled. The residue consists of water (22.7%) and a resin, the composition of which is as follows:

| | |
|---|---|
| formaldehyde | 42.62% by weight |
| phenol | 19.66% by weight |
| urea | 35.90% by weight |
| caustic soda | 1.82% by weight |

EXAMPLE 4

Into the boiler of a laboratory type rotary evaporator are placed 250 g of a waste aqueous solution of formaldehyde with a formaldehyde content equal to 4.8% by weight and 268.5 g of an aqueous waste solution of phenol with a phenol content equal to 3.5% by weight.

1 g sodium hydroxide is added to the mixture. A nitrogen atmosphere is maintained in the apparatus.

By means of a thermostatically controlled bath, the temperature is kept at 100°C for 3 hours while the mixture is kept slightly agitated. At the end of this period, 450 g of the previously described aqueous formaldehyde solution and 35.88 g of urea are added. The mixture is then kept at 100°C for 2 hours and at the end of this period the water is evaporated off at 120 torr.

In this way, 800.4 g of water are separated, containing 0.18% by weight of formaldehyde and 0.0025% by weight of phenol.

The resin recovered in the residue of distillation has the following composition:

| | |
|---|---|
| formaldehyde | 40.85% by weight |
| phenol | 11.97% by weight |
| urea | 45.90% by weight |
| caustic soda | 1.28% by weight |

EXAMPLE 5

Into the boiler of a laboratory type rotary evaporator are placed 400 g of waste aqueous solution of formaldehyde containing 1.20% by weight of formaldehyde and 0.60% by weight of methanol and 80 g of an aqueous waste solution of phenol containing 4.7% by weight of phenol.

0.4 g of sodium hydroxide are also added. The apparatus is maintained in an inert atmosphere by a stream of nitrogen. The temperature is then raised to 110.5°C and kept at that level for 4 hours. At the end of this period, 400 g of the previously described aqueous formaldehyde solution and 7.2 g of urea are added. The temperature is then maintained at 110.5°C for 1 hour. The water is then evaporated off at 60 torr in order to separate 97.4% by weight with respect to the mixture subjected to distillation. The water which is thus separated has a formaldehyde content equal to 0.10% by weight and a phenol content equal to 0.0015% by weight.

What we claim is:

1. Process for the simultaneous recovery in the form of a useful product, of formaldehyde and phenol contained in the relative waste waters, and for the purification of the said waste waters, comprising:

a. mixing a waste aqueous solution containing phenol in a concentration of 0.01 to 5.0% by weight with a waste aqueous solution containing formaldehyde in a concentration of 0.5 to 10% by weight and, in a first stage of reaction, forming a resol phenolic resin at a working temperature of from 60° to 120°C over a period of 1 to 8 hours, the pH of the reaction medium being higher than 7 up to approximately 12;

b. adding to the aqueous solution of phenolic resin obtained in the first stage urea and possibly a further quantity of the waste aqueous solution containing formaldehyde and, in a second stage of reaction, forming a mixed phenol formaldehyde urea resin at a working temperature of from 60° to 120°C for a period of 1 to 4 hours; and c. distilling the water from the aqueous solution containing the mixed resin, obtained in the second stage of the reaction, the working pressure being below atmospheric pressure.

2. Process according to claim 1, characterized in that in the first stage of reaction, a basic pH is maintained in the medium, using sodium hydroxide in quantities of 0.12 to 0.35 moles to every mole of phenol.

3. Process according to claim 2, characterized in that the said quantities of sodium hydroxide are 0.20 to 0.25 moles to every mole of phenol.

4. Process according to claim 1, characterized in that in the first stage of reaction, the molar ratios of formaldehyde to phenol are from 1.8:1 to 15:1.

5. Process according to claim 4, characterized in that the said ratios are 3:1 to 4:1.

6. Process according to claim 1, characterized in that in the second stage of reaction, the molar ratios of total formaldehyde to phenol are from 3:1 to 15:1.

7. Process according to claim 6, characterized in that the said ratios are 5:1 to 12:1.

8. Process according to claim 1, characterized in that in the second stage of reaction, the molar ratios of total formaldehyde to urea are from 1:1 to 5:1.

9. Process according to claim 1, characterized in that distillation of water is carried out at pressures of 30 to 150 torr.

* * * * *